United States Patent
Witt et al.

(10) Patent No.: US 6,384,381 B2
(45) Date of Patent: *May 7, 2002

(54) OVEN DEVICE FOR RAPID HEATING OF FOOD ITEMS

(75) Inventors: Allan E. Witt, Brown Deer; Gerhard H. Wenzel, Sussex, both of WI (US)

(73) Assignee: Hatco Corporation, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/866,086

(22) Filed: May 25, 2001

Related U.S. Application Data

(63) Continuation-in-part of application No. 09/520,294, filed on Mar. 7, 2000, now Pat. No. 6,262,396.

(51) Int. Cl.[7] .............................. H05B 3/26; H05B 3/64; A21B 1/22; A47J 37/06
(52) U.S. Cl. ........................ 219/411; 219/543; 219/553; 219/409; 219/410
(58) Field of Search .................................. 219/405, 409, 219/410, 411, 412, 395, 398, 552, 553, 685, 543

(56) References Cited

U.S. PATENT DOCUMENTS

| | | |
|---|---|---|
| 3,098,924 A | 7/1963 | Salton et al. |
| 3,140,389 A | 7/1964 | Windes |
| 3,152,242 A | 10/1964 | De Mott |
| 3,313,917 A | 4/1967 | Ditzler et al. |
| 3,678,248 A | 7/1972 | Tricault et al. |
| 3,974,358 A | 8/1976 | Goltsos |
| 4,343,985 A | 8/1982 | Wilson et al. |
| 4,542,268 A | 9/1985 | Jarvis et al. |
| 4,675,507 A | 6/1987 | Akiyoshi et al. |
| 4,733,054 A | 3/1988 | Paul |
| 4,822,981 A | 4/1989 | Chaudoir |
| 4,990,749 A | 2/1991 | Devine et al. |
| 5,000,083 A | 3/1991 | Pickave |
| 5,036,179 A | 7/1991 | Westerberg et al. |
| 5,393,958 A | 2/1995 | Gross et al. |
| 5,517,005 A | 5/1996 | Westerberg et al. |
| 5,708,255 A | 1/1998 | Lamanna et al. |
| 5,736,713 A | 4/1998 | Westerberg |
| 5,783,803 A | 7/1998 | Robards, Jr. |
| 5,883,362 A | 3/1999 | Pettibone et al. |
| 5,900,173 A | 5/1999 | Robards, Jr. |
| 5,948,301 A | 9/1999 | Liebermann |
| 5,968,397 A | 10/1999 | Wyland et al. |
| 6,057,528 A | 5/2000 | Cook |
| 6,069,345 A | 5/2000 | Westerberg |

FOREIGN PATENT DOCUMENTS

EP  0 222 216  5/1987

OTHER PUBLICATIONS

EP Form 1507.0 Hatco Corporation Sep. 17, 2001.

*Primary Examiner*—Joseph Pelham
(74) *Attorney, Agent, or Firm*—Foley & Lardner

(57) ABSTRACT

An oven device for final finishing of a food item includes an oven housing defining a heating cavity configured to receive at least one food item to be heated, and an upper heating unit within the oven housing above the heating cavity. The upper heating unit includes a heating element that generates radiant heat directed onto the food item in the heating cavity. The oven housing includes at least one reflective panel for distributing radiant heat within the heating cavity. The upper heating element includes a rapidly-heating, high-intensity heating element capable of being cycled on for final finishing of the food item when the food item is received in the heating cavity, and capable of being cycled off when final finishing is not being performed. The final finishing typically includes browning a top surface of the food item, or melting a topping onto the top surface of the food item.

20 Claims, 4 Drawing Sheets

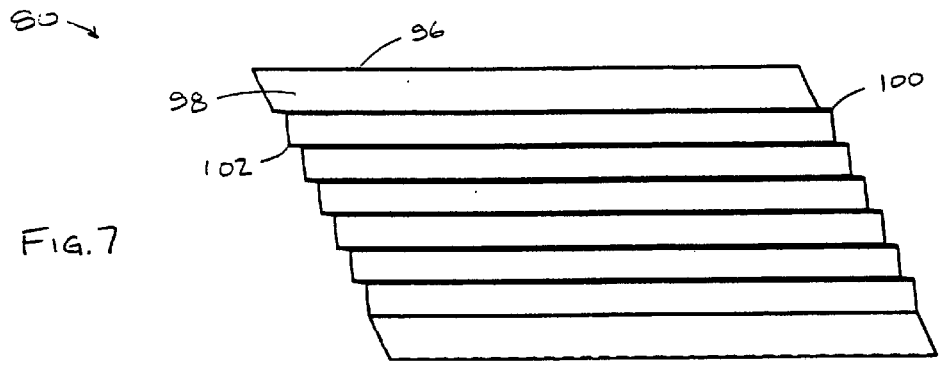
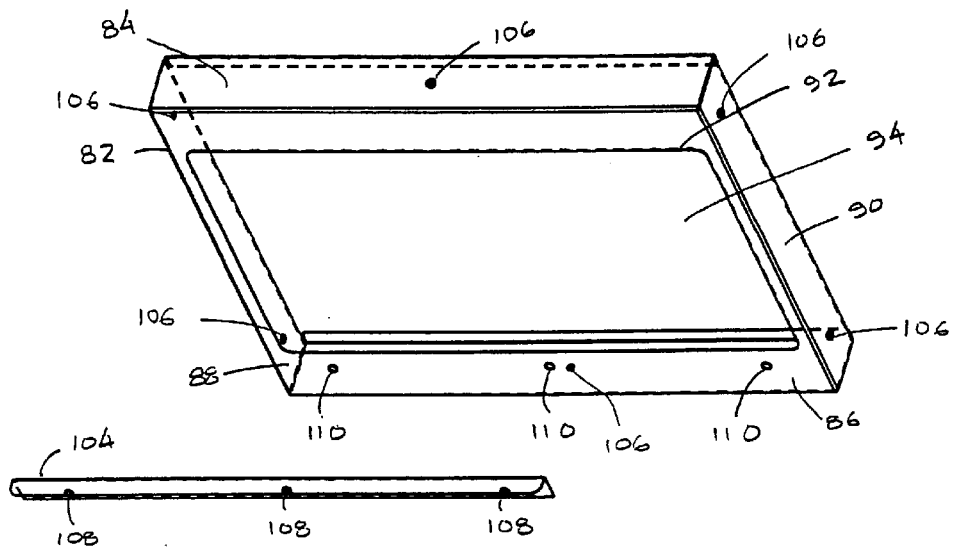
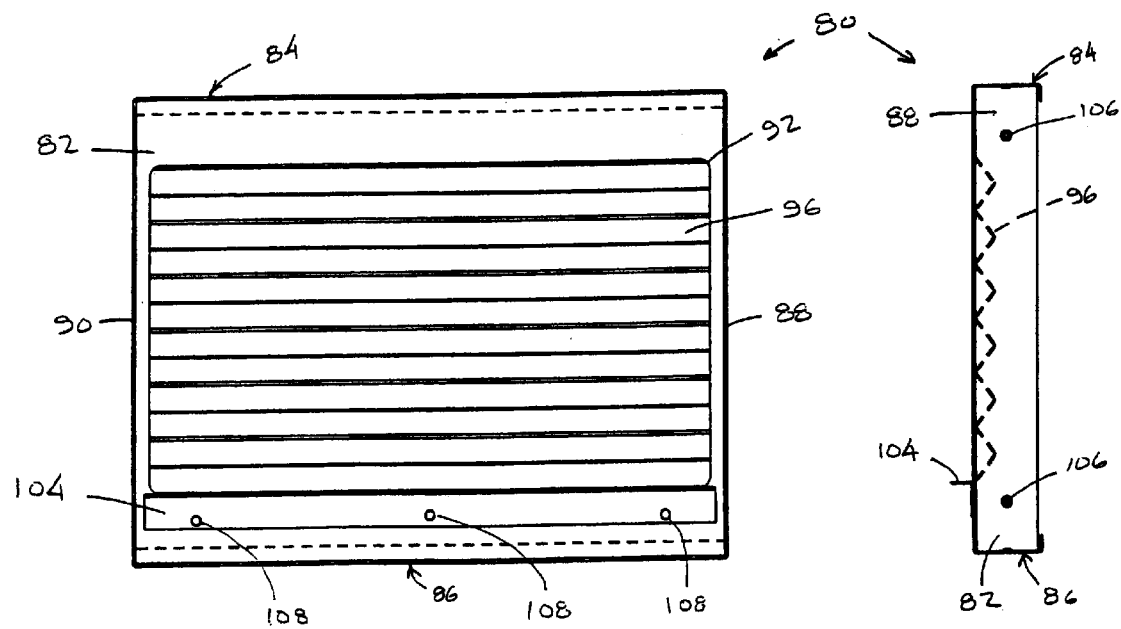

OVEN DEVICE FOR RAPID HEATING OF FOOD ITEMS

RELATED APPLICATIONS

This application is a continuation-in-part of U.S. patent application Ser. No. 09/520,294, filed Mar. 7, 2000, now U.S. Pat. No. 6,262,396 entitled "Oven Device for Rapid Heating of Food Items", which is hereby incorporated by reference.

FIELD OF THE INVENTION

The invention relates generally to an oven device for rapidly heating food items. More particularly, the invention relates to an improved oven device for rapid melting or browning of the top surfaces of food items, which may typically involve melting or browning toppings or side-dishes which have been applied onto or beside pre-cooked food components. The oven device also provides the capacity to simultaneously heat the plate or other support assembly for the food items.

BACKGROUND OF THE INVENTION

In the restaurant business, components of individual food items or of complete meals (e.g., hamburger patties; broiled beef; fried chicken; etc.) are often pre-cooked at cooking locations around the restaurant's kitchen. These pre-cooked food components are then assembled into completed food items or meals before presentation to the customer. During the final assembly process, various toppings or side-dishes are served on or beside the pre-cooked components, and the toppings or side-dishes are melted or browned before the food items or meals are served. For example, sliced or grated cheese is often melted onto a pre-cooked hamburger patty to make a cheeseburger, or whipped potatoes are browned after being added as a side-dish to a plate of fried chicken. Together with melting or browning the top surfaces of the food items or complete meals, it is often necessary or desirable to simultaneously heat the serving plate or other assembly on which the food items or meals are served in order to provide the perception of a fresh-cooked hot meal. For example, Mexican restaurants typically serve fajitas on a sizzling iron skillet. Ovens used to perform the finishing functions of melting or browning the toppings of the food items before they are served can be referred to as "thermal finishers".

One existing system for performing these functions employs a plate heater to heat the serving plate, and a gas over-fired broiler known in the restaurant industry as a "Salamander" broiler to perform the final finishing (i.e., the melting or browning) of the toppings or side dishes. This system, however, has significant disadvantages. The over-fired gas broiler generates a tremendous amount of heat (e.g., 40,000 to 60,000 BTUs), much of which is wasted since the Salamander broiler must be left on continuously since it takes a significant period of time to warm up, even though the broiler is used for only a fraction of the time that it is turned on. Also, since the Salamander broiler is open to the kitchen, the high heat output level of the broiler heats up the kitchen and requires the installation of kitchen exhaust fans in order to exhaust the excess heat. Thus, the Salamander broiler is a wasteful system for melting toppings and warming serving plates.

Another existing system employs a conveyor oven which must also be turned on all of the time, and is relatively slow in comparison to the Salamander broiler. The slow heating time of this alternative type of system is an important disadvantage in, for example, the fast-food industry. In addition, since the entire plate or support assembly passes through the heating cavity via the conveyor, the entire plate including its rim becomes hot such that the plate cannot be efficiently handled by food service workers without using insulated gloves or other methods.

Thus, it would be advantageous to provide an improved oven device for rapid heating of food items which overcomes these and other disadvantages of existing systems. It would be advantageous to provide such an oven device which can be turned on and off as needed, thereby decreasing both energy usage and the amount of heat vented into the kitchen as compared to an oven which must be left on continuously. The decreased amount of heat vented into the kitchen would allow the exhaust hood or other ventilation method needed to exhaust the excess heat to be dispensed with, and would result in savings in air conditioning and ventilation costs. It would also be advantageous to provide an oven device for rapid heating of food items capable of heating the items significantly faster than is possible using existing conveyor oven systems. Also, it would be advantageous to provide an oven device for rapidly heating food items which is capable of heating only a portion of the plate or support assembly for the items such that the plate or support assembly could be efficiently handled by the restaurant's food service workers. For example, it would be advantageous to provide such an oven device wherein the rims of plates holding the food items would not be subjected directly to the heat source and would not be subjected to the radiant heat of the oven. This would allow food service workers to pick up the plates by their rims without using insulated gloves or other methods.

SUMMARY OF THE INVENTION

One embodiment of the invention provides an oven device for final finishing of a food item. The oven device includes an oven housing defining a heating cavity therein and an upper heating unit disposed within the oven housing above the heating cavity, and at least one reflective panel for distributing radiant heat within the heating cavity. The heating cavity is configured to receive at least one food item to be heated by the oven device. The upper heating unit includes an upper heating element. The upper heating unit generates radiant heat which is directed onto the at least one food item when the at least one food item is received in the heating cavity. The upper heating element includes a rapidly-heating, high-intensity heating element capable of being cycled on for final finishing of the at least one food item when the at least one food item is received in the heating cavity, and capable of being cycled off when such final finishing is not being performed.

Another embodiment of the invention provides an oven device for final finishing of a food item including an oven housing defining a heating cavity therein, and at least one reflective panel for distributing radiant heat within the heating cavity, and upper and lower heating units disposed within the oven housing above and below the heating cavity, respectively. The heating cavity receives at least one food item to be heated. The upper and lower heating units include an upper and a lower heating element, respectively. The upper and lower heating units generate radiant heat which is directed onto the at least one food item when the at least one food item is received in the heating cavity. The upper and lower heating elements each include a rapidly-heating, high-intensity heating element which can be cycled on for final finishing of the at least one food item when the at least one food item is received, and of being cycled off when such final finishing is not being performed.

Another embodiment of the invention provides an oven device for final finishing of a food item including oven housing means for defining a heating cavity for receiving at least one food item, resistive ribbon heating means within the oven housing means for generating high-intensity radiant heat and directing the heat onto a top surface of the at least one food item when the at least one food item is within the heating cavity, means for distributing the radiant heat within the heating cavity, and means for cycling the radiant heat on for final finishing the at least one food item when the at least one food item is received within the heating cavity and for cycling the heat off when such final finishing is not being performed.

BRIEF DESCRIPTION OF THE DRAWINGS

The present invention will become more fully understood from the following detailed description, taken in conjunction with the accompanying drawings, wherein like reference numerals refer to like parts, in which:

FIG. 7 is a rear exploded perspective view of a reflective wall panel for the oven device;

FIG. 8 is a front elevation view of a reflective wall panel for the oven device; and FIG. 9 is a right side elevation view of a reflective wall panel for the oven device.

DESCRIPTION OF THE PREFERRED EMBODIMENTS

Figure 1:
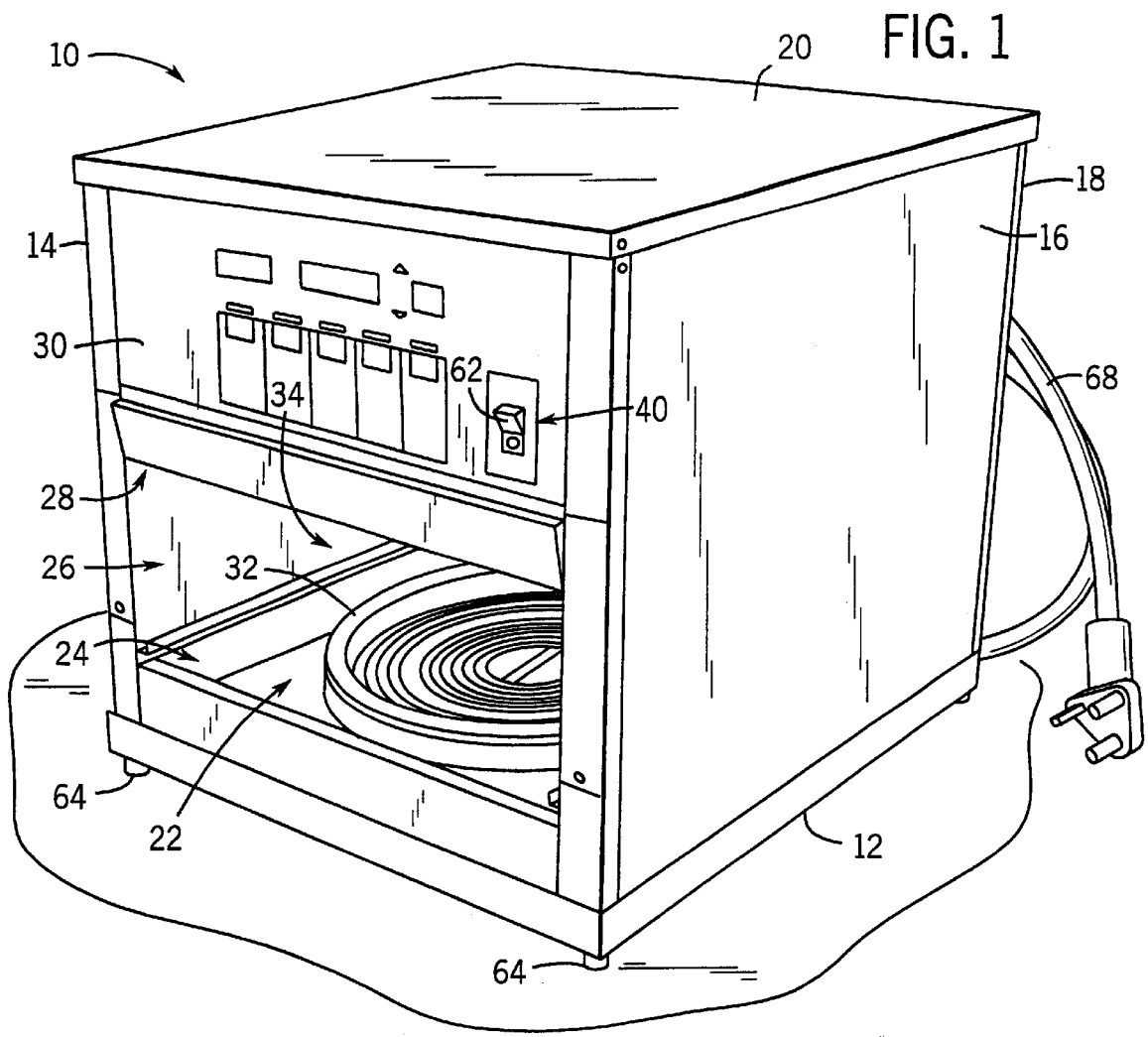
FIG. 1 is a perspective view of an oven device for rapidly heating food items (i.e., a thermal finisher) according to one embodiment of the invention.

Referring to FIGS. 1–5, an oven device 10 in accordance with one embodiment of the invention includes an oven housing comprised of a base 12, left and right side walls 14 and 16 attached to and extending upward from the left and right edges of base 12, a rear wall 18 attached to and extending upward from the rear edge of base 12 between side walls 14 and 16, and a top 20 attached to left and right side walls 14 and 16 and rear wall 18 opposite base 12. Base 12, side walls 14 and 16, rear wall 18 and top 20 are formed of food-grade stainless steel, each with an internal insulation layer for containing heat generated by oven device 10.

Figure 2:
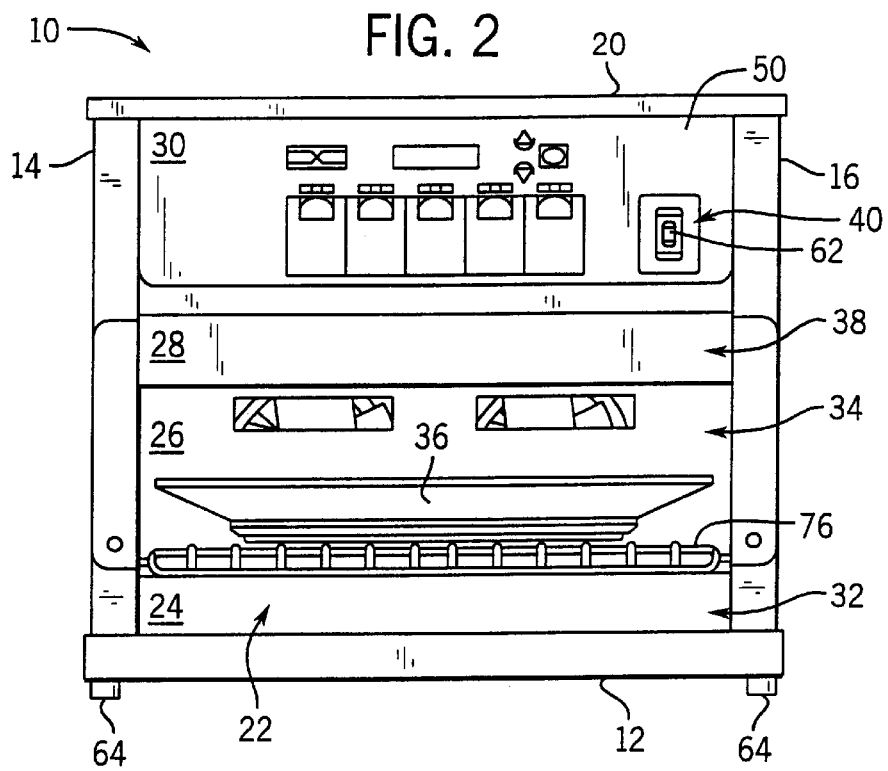
FIG. 2 is a front view of the oven device shown in FIG. 1.
Figure 3:
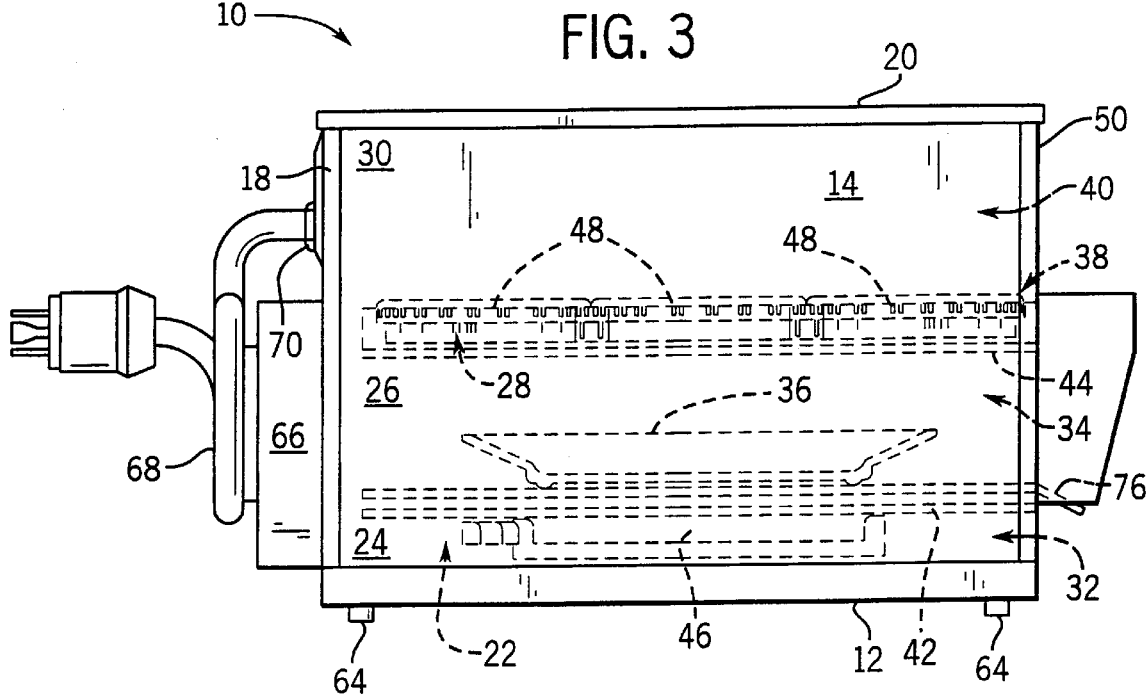
FIG. 3 is a side view of the oven device shown in FIG. 1.
Figure 4:
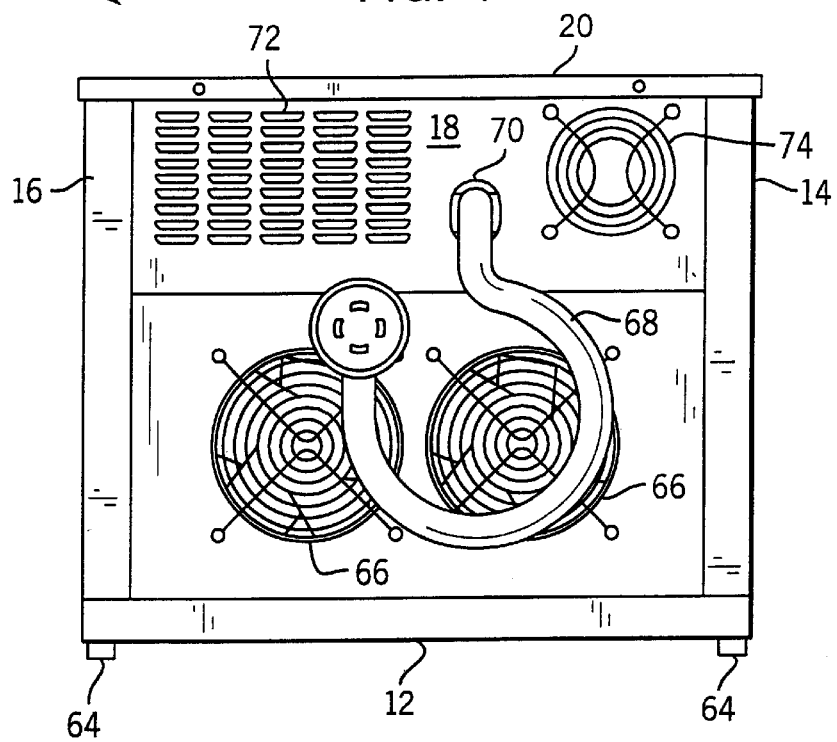
FIG. 4 is a rear view of the oven device shown in FIG. 1.

Base 12, left and right side walls 14 and 16, rear wall 18 and top 20 together define a cavity 22 having a bottom portion 24, a lower middle portion 26, an upper middle portion 28, and a top portion 30. Bottom portion 24 is disposed above and adjacent to base 12 and is configured to support a lower heating unit 32. Lower middle portion 26 forms a heating cavity 34 disposed above base heating unit 32 and open to the front of oven device 10 for receiving one or more food items 36. Although FIGS. 2 and 3 show food items 36 as including food served in a casserole, food items 36 can include many types of foods and complete meals which typically go through a final finishing process in restaurants and cafeterias before being served to customers. Such food items can be served on plates or other support assemblies. For example, food items 36 can include cheeseburgers served on plates, or Mexican dinners served on platters. Food items 36 can also be served without any plates or serving dishes. For example, food items 36 could be foil-wrapped baked potatoes, with cheese or other toppings which can be melted or browned by oven device 10.

Upper middle portion 28 of cavity 22 is disposed above heating cavity 34 and is configured to support an upper heating unit 38. Top portion 30 is disposed above and adjacent to upper heating unit 38 and is configured to support a control unit 40. Thus, cavity 22 of oven device 10 is configured to receive lower and upper heating units 32 and 38 supported on bottom and top of heating cavity 34, with lower and upper heating units 32 and 38 being configured to provide heat from both the top and the bottom of any food items 36 placed within heating cavity 34. Control unit 40 is then used to control the lower and upper heating units 32 and 38.

As described further below, control unit 40 has the capability of independently controlling the heating cycles of heating units 32 and 38, preferably through the use of one or more microprocessor-controlled heating sequences that are preprogrammed or preset to meet the heating needs of particular types of food items. In one embodiment, control unit 40 can be programmed to run one of five different predetermined heating sequences via activation of a corresponding one of five different push-button switches by the food service operator, with each heating sequence capable of independently varying the cycle times and power levels of both heating units 32 and 38. The push-buttons can thus be used to activate the proper heating sequence for each of five different food items 36 with varying requirements.

Lower and upper heating units 32 and 38 each comprises a stainless steel box or housing sized to fit within bottom and upper middle portions 24 and 28 of cavity 22, respectively, so that heating units 32 and 38 can be securely attached within oven device 10 by, for example, welding or fasteners (e.g., screws, rivets). Referring specifically to FIG. 3, the top surface of lower heating unit 32 is formed of a lower glass panel 42, and the bottom surface of upper heating unit 38 is formed of an upper glass panel 44. Glass panels 42 and 44 are attached to the edges of the respective housings of heating units 32 and 38. One or more electrically-powered heating elements 46 are mounted in lower heating unit 32, and one or more such heating elements 48 are mounted in upper heating unit 38. Heating elements 46 and 48 are adapted to focus radiant energy into heating cavity 34 through respective glass panels 42 and 44. Each heating element 46 and 48 receives a flow of electricity under the control of a control board mounted within control unit 40.

When food items 36 are placed within heating cavity 34 between lower and upper glass panels 42 and 44, heat generated by heating elements 46 and 48 is directed or focused toward those food items 36 from both above and below the food items. The heat from lower heating unit 32 performs the dual functions of heating the plate or other support assembly and heating the food product itself, and the heat from upper heating unit 38 browns or melts the top of the food product.

Heating elements 46 and 48 are preferably resistive heating elements which employ a thin, high-intensity resistive ribbon element which heats up to an orange glow almost instantaneously (e.g., in less than about 1.0 or 0.5 second). Oven device 10 is thus able to reach its operating temperatures very quickly, which provides an important advantage in the fast-food industry. Heating elements 46 and 48 can be, for example, Halient elements available from EGO North America. Alternatively, other types of heating elements can be used, such as elements which use a resistive wire coil. Preferably, the elements will be capable of being heated to their operating temperatures quickly, with the maximum allowed heating time depending on the application and the needs of the particular restaurant or operator.

Figure 5:
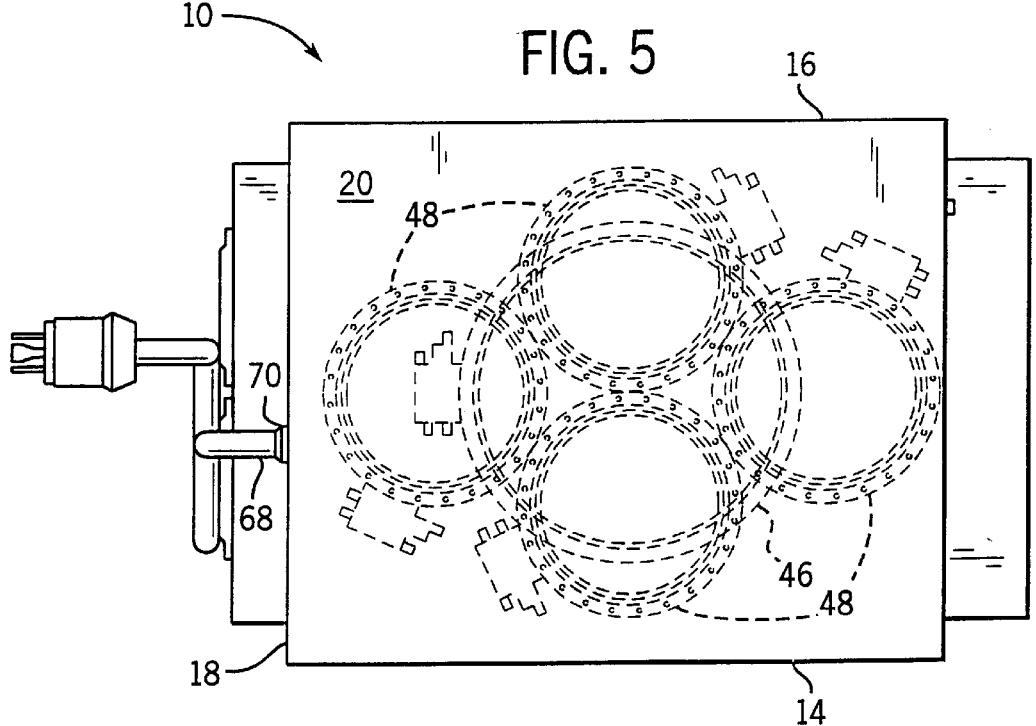
FIG. 5 is a top view of the oven device shown in FIG. 1, including an illustration of the geometric arrangement of the internal heating elements.

The size and number of heating elements 46 and 48 within heating units 32 and 38 will depend on the particular food service application, and to a large extent will depend on the sizes and the shapes of the plates or other food support assemblies used. In one embodiment of oven device 10 designed for a Mexican restaurant that uses oversized oval platters for serving meals, heating elements 46 and 48 are selected as shown in FIGS. 3 and 5. In particular, mounted in lower heating unit 32 is a single Halient heating element having a nine (9) inch diameter and a power rating of 2500 W with a supply voltage of 240 $V_{AC}$ (EGO Part No. 10.53111.043), and mounted in upper heating unit 38 is an array of four Halient heating elements, each having a six (6) inch diameter and a power rating of 1250 W with a supply voltage of 240 $V_{AC}$. Heating elements having diameters of nine and six inches and power ratings of 2400 W and 1200 W, respectively, with a 208 $V_{AC}$ supply are also available. Note the geometrical arrangement of the upper heating elements 48 (as best shown in FIG. 5) provides good heat coverage even for the oversized oval platters which are used by the above-referenced Mexican restaurant.

In an alternate embodiment of oven device 10 designed for use with regular circular serving plates (not shown), a single Halient heating element with a diameter of nine (9) inches is mounted in each of lower and upper heating units 32 and 38, with the two heating elements mounted opposite each other. Where the serving plates have a diameter larger than that of the heating elements, the rims of the plates placed between these two heating elements will not receive direct radiant energy from the heating elements. In this case, the rims of the plates will tend to remain relatively cool during the short time required to perform the final finishing process (i.e., melting or browning the food items), thus allowing the food service workers to handle the plates by their rims without the need for insulated gloves or other methods (e.g., using tongs to handle the heated plates). For example, if an 11 inch diameter plate is placed between lower and upper nine inch diameter heating elements for the short time needed to melt cheese placed on top of a precooked hamburger patty, the rim of the plate will tend to remain cool enough to allow handling by a food service worker without the need for any special equipment.

Other types, sizes, numbers and geometrical arrangements of heating elements 46 and 48 are possible depending upon the particular oven application, and on the size and shape of the serving plates regularly used in that application. Such alternative oven configurations will be readily apparent to those of skill in the art.

Lower and upper glass panels 42 and 44 are clear glass panels which pass most of the radiant energy generated by heating elements 46 and 48 to heating cavity 34 to heat any food items 36 placed therein by the food service operator. In one embodiment, glass panels 42 and 44 are tempax barosilicate glass panels made by Schott America of New York, sold under the SCHOTT glass tradename. These panels are formed of a clear, quartz glass that transmit or pass about 99% of the radiant energy. Other types of glass could also be used, including Ceran glass, although Ceran glass may not transmit radiation as efficiently as the Schott glass.

As discussed above, the application of electrical power to heating elements 46 and 48 in heating units 32 and 38 is controlled by control unit 40. Unit 40 comprises a stainless steel housing sized to fit within top portion 30 of cavity 22, such that unit 40 can be securely attached within oven device 10 using, for example, welding or fasteners (e.g., screws, rivets). Control unit 40 has a front surface 50 that provides an operator interface having a number of input devices (e.g., switches) for allowing the operator to control the operations of oven device 10, and a number of output devices (e.g., displays) for displaying status information to the operator.

Control unit 40 includes an electronic controller/output circuit board (not shown) mounted within its housing and an operator interface board 52 mounted to front surface 50. Operator interface board 52 is mounted such that the input devices (e.g., switches) on board 52 are accessible to the operator (e.g., through apertures in front surface 50), and such that the output devices (e.g., displays) on board 50 are visible to the operator (e.g., also via apertures in front surface 50). Of course, the input and output devices could also be mounted directly onto front surface 50. Control unit 40 provides programmable control of upper and lower heating units 32 and 38, using timer circuits or a microprocessor-based controller. In one embodiment, control unit 40 provides the operator or food service worker with a plurality (e.g., five) of programmable sequences for independently operating lower and upper heating elements 46 and 48, with a corresponding plurality (e.g., five) of push-buttons provided to allow for one-touch control for each sequence.

Each sequence can be programmed for a different type of food item, thereby allowing the food service operator to select one of the plurality (e.g., five) of predetermined sequences simply by pushing a push-button. For example, oven device 10 could be configured or programmed such that one push-button triggers a first preset sequence for operating lower and upper heating elements 46 and 48 in a first manner suitable for final finishing of fajitas, a second push-button triggers a second present sequence for operating elements 46 and 48 in a second manner suitable for final finishing of enchiladas, etc. In this way, oven device 10 can be programmed to provide a simple operator interface allowing even operators with little experience and training to accurately control the heating of many food items.

Figure 6:
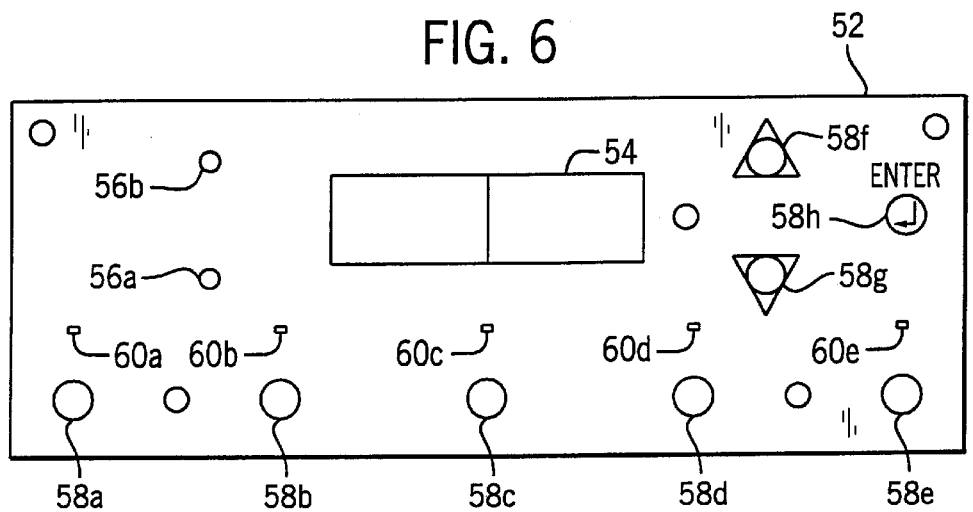
FIG. 6 is a diagram showing the layout of a timer board used by the oven device of FIG. 1, which provides the user interface as also shown in FIG. 2.

As best shown in FIG. 6, operator interface board 52 supports an alphanumeric display 54, two amber LEDs 56a and 56b, eight push-button (i.e., momentary) input switches 58a–58h, and five green LEDs 60a–60e. Display 54 includes a number (e.g., four) of seven-segment LEDs. Lower amber LED 56a indicates status of lower heating element(s) 46 and upper amber LED 56b indicates status of upper heating element(s) 48. The push-button input switches comprise five program switches 58a–58e, an up-arrow switch 58f, a down-arrow switch 58g, and an enter switch 58h. The five green LEDs 60a–60e indicate the status of each of the five programs selectable by the operator using program switches 58a–58e.

The electronic controller/output circuit board mounted within control unit 40 includes four line voltage output circuits, a timer circuit and an annunciator (e.g., a buzzer circuit). Each line voltage output circuit includes a load-carrying triac. Triacs are solid-state switches capable of reliably handing a large number (e.g., hundreds of thousands) of power cycles without failure. For oven device 10, the controller/output circuit board receives four voltage inputs including a 12–24 V input voltage, a first 208–240 $V_{AC}$ line voltage input (L1), a second 208–240 $V_{AC}$ line voltage input (L2), and a third 208–240 $V_{AC}$ line voltage input (L3), and then generates four voltage outputs including a first line voltage output for two upper heating elements 48 (circuit A), a second line voltage output for two upper heating elements 48 (circuit B), a third line voltage output for lower element 46 (circuit C) and a fourth line voltage output for lower element 46 (circuit D). Each of the triacs has the capability to handle a 12 A resistive load.

The timer circuit on the controller/output circuit board operates the triacs semi-independently to control the supply of line voltages applied to heating elements 46 and 48. In one embodiment, the timer circuit is a programmable timer configured to run from 0 to 300 seconds in single second increments. Preferably, the timer circuit includes a microprocessor circuit configured (i.e., programmed) to perform the various functions described below. As noted, the timer circuit provides a plurality (i.e., five) of programmable sequences for operating the upper and lower heating elements, with each "run-time" sequence being triggered by the edge signal from one of the five program switches 58a–58e. In the microprocessor embodiment of the timer circuit, the microprocessor stores five different programs, each used for a different type of food item 36. Each program allows the restaurant owner to select the on-time, off-time and amount of power to be applied to food items 36 by each of heating elements 46 and 48. By carefully managing the heating elements, food items 36 can be heated quickly without being burned. Along with the five programmable sequences for both sets of elements (i.e., lower and upper), control unit 40 also provides a programmable stand-by sequence, an auto-off mode, and a curing mode sequence. Each of these sequences is further described as follows:

Run-Time Sequence: Lower and upper heating elements 46 and 48 both have 5 separately programmable timing sequences and 10 selectable power levels. The particular values for the timing sequences and selectable power levels used for the final finishing (e.g., browning, melting) of a particular food item 36 are determined via empirical testing.

Timing Sequences: The time values for lower and upper heating elements 46 and 48 represent their "on" times and the time value for both heating elements 46 and 48 is any value between 0 and 300 seconds. When a sequence is triggered, the lower and upper heating elements are both de-energized at the same time. For example, if the "on" time for the upper element is 45 seconds, and the "on" time for the lower element is 65 seconds, the lower element is energized 20 seconds before the upper element so both elements are de-energized at the same time.

Selectable Power Levels: The power levels of heating elements 46 and 48 are selected by varying the duty cycle of the on time and may be set in 5% or 10% power level increments. For example, a 10% power level is achieved by cycling on for 4 seconds and off for 36 seconds, 20% power level is achieved using 4 seconds on and 16 seconds off, 30% power level is achieved using 4 seconds on and 9 seconds off, 40% power level is achieved using 4 seconds on and 6 seconds off, 50% power level is achieved using 4 seconds on and 4 seconds off, 60% power level is achieved using 6 seconds on and 4 seconds off, 70% power level is achieved using 9 seconds on and 4 seconds off, 80% power level is achieved using 10 seconds on and 2.5 seconds off, 90% power level is achieved using 18 seconds on and 2 seconds off, and 100% power level is achieved by remaining the heating elements 46 and 48 continuously on.

Stand-By Mode: When a run-time sequence is not being performed, oven device 10 remains in a stand-by mode. During the stand-by mode, the upper elements cycle at a selectable power level, and the display indicates that the oven is in stand-by mode by displaying "rEdY". The power levels which can be selected during the stand-by mode include the 10%, 20%, 30%, 40%, 50%, 60% and 70% on time power levels. The purpose of stand-by mode is to maintain the internal temperature of oven device 10 at an elevated temperature (e.g., 300–400° F.) in order to further reduce the cooking time of the food items. This elevated temperature depends on the above-described cycle time. In an alternative embodiment, the heating elements are not powered in the standby mode, further conserving energy used by oven device 10.

Auto-Off Mode: When oven device 10 is not used for a specified period of time, the stand-by mode is discontinued and the auto-off mode begins. In the auto-off mode, the display indicates "OFF" and the heating elements are not energized. Actuation of any of push-buttons 58a–58e will reactivate the stand-by mode by beginning the curing mode sequence. The specified time is factory set to a value between 0 and 60 minutes. Of course, the specified time-period could also be user modifiable.

Curing Mode Sequence: The controller automatically executes a curing mode when oven device 10 is turned on (using, for example, a rocker switch 62 mounted to front surface 50 of control unit 40, shown in FIG. 62), or when exiting the auto-off sequence. During curing mode sequence, the heating elements are turned on at full power for 60 seconds, then full off for 10 seconds. and the display reads "StbY" to indicate the standby status of oven device 10. During the curing mode, oven device 10 cannot be put into its normal run sequence. When the curing sequence has been completed, the controller automatically goes into the stand-by mode.

The setup (i.e., programming) procedure for the run-time sequence is as follows: First, the appropriate program switch 58a–58e and enter switch 58h are pushed simultaneously. For example, if program no. 1 is to be adjusted, program switch 58a and enter switch 58h are pushed at the same time for 3 seconds; if program no. 2 is to be adjusted, program switch 58b and enter switch 58h are pushed at the same time for 3 seconds, etc. Second, after the appropriate program has been selected, the green LED 60a–60e over the selected program switch 58a–58e is illuminated, upper amber LED 56b is lit and alphanumeric display 54 indicates the power level value which is currently programmed ("$P_{13}40$" for the 40% power level) scrolls to the next programmable sequence. Each sequence includes four values: (1) the upper power level value (upper amber LED 56b is lit; display 54 shows, e.g., "$P_{13}40$"); (2) the upper time value (upper amber LED 56b is lit; display 54 shows, e.g., "$T_{13}65$"); (3) the lower power level value (lower amber LED 56a is lit; display 54 shows, e.g., "$P_{13}40$"); and (4) the lower time value (lower amber LED 56a is lit; display 54 shows, e.g., "$T_{13}65$"). Fourth, at each step, up and down arrow buttons 58f and 58g can be used to increase or decrease the values. Fifth, when all of the values have been properly adjusted, activation of the respective program button 58a–58b causes the controller to accept the changes. After 15 seconds of no activity, however, the controller is programmed to exit the programming mode without accepting the changes. Sixth, activation of any of the other, non-selected program buttons 58a–58e during the programming process will cause the adjustments to be manually cancelled. After being programmed, the user actuates each program button 58a–58e to activate the desired heating sequence.

The setup procedure for the standby mode is as follows. First, enter button 58h and up arrow button 58f are pushed simultaneously for 3 seconds. Second, display 54 indicates the power level value currently programmed (e.g., "P$_{13}$40") for use during the standby mode. The power level can then be adjusted by pushing up and down arrow buttons 58f and 58g. Third, enter button 58h is activated to accept the new value. Fourth, if no adjustments are made after 15 seconds, the controller exits the standby programming mode without accepting the changes. Fifth, activation of any program switch 58a–58e during the standby programming will cause the controller to exit standby setup mode without accepting any of the changes that were made.

The operation of the displays and lamps is as follows. First, if a program has not been selected, oven device 10 is in standby mode and LED display 54 will show "rEdY". Second, on release of any of the five "start buttons" (i.e., program buttons 58a–58e), LED display 54 will show the time (e.g., "T_83"), and the display will begin to count down in one second increments. Third, when the time has elapsed, display 54 will flash or blink the message "dOnE" for 6 seconds, all of the green LEDs 60a–60e will flash for 6 seconds and the annunciator will beep for 6 seconds. Pressing any of buttons 58a–58h during this 6 second period will cancel the annunciator but will not start the program sequence. Fourth, after the 6 seconds have elapsed, display 54 will indicate "rEdY". Then, whenever the upper element (s) 48 are energized, upper amber LED 56b will be energized and whenever the lower element(s) 46 are energized, the lower amber LED 56a will be energized.

The operation of the annunciator is as follows. First, the annunciator will beep in response to every push of one of buttons 58a–58h to verify the entry. Second, when a normal timing sequence has been completed, the annunciator will energize as described above. Third, preferably, the annunciator circuit includes a DIP switch or other device to allow the user to remove the annunciator function.

During a normal run time sequence, pushing any of buttons 58a–58h prior to the completion of the timing cycle will cancel that run time sequence, and will cause the controller to enter the standby mode. At that point, the operator can press another of the program buttons 58a–58e to start another heating sequence.

A number of components are mounted external to oven device 10. The external components include a plurality (i.e., four) of rubber or plastic supports 64 attached to the four corners of base 12 to provide support for oven device 10 on a support surface (not shown), such as a restaurant kitchen countertop. A pair of axial fans or blowers 66 are mounted to the back of rear wall 18 so that axial fans 66 can blow ambient air through heating cavity 34. The airflow provided by axial fans 66 evenly distributes the heat within heating cavity 34, thereby preventing the back of the serving plates placed within heating cavity 34 from getting too hot while preventing the front of the serving plates from getting too cool (which otherwise may occur since heating cavity 34 is open in the front and closed in the rear). The air flow cools the glass panel 44 for upper heating element 48, and prevents the heat from being applied unevenly to food products 36 being heated. Alternatively, in a pass-through oven wherein both the front and back of the heating cavity are open (to allow food products to be inserted at one end and taken out from the other end), its likely that no axial fan will be needed since the heat will be more evenly distributed.

An electrical power cord 68 passes through a grommet 70 into the interior of control unit 40 to provide the electrical energy needed to run oven device 10. To provide a cooling air flow to the interior components of control unit 40, the rear surface of control unit 40 can be provided with louvers 72, and a cooling fan 74 can also be mounted on that rear surface to blow cooling air into control unit 40.

As shown in FIGS. 1–5, a wire rack 76 is provided to support food items 36 above lower glass panel 42. Wire rack 76 preferably slides into heating cavity 34 using rails or other mounting guides along the cavity's inside surfaces. Alternatively, the food items can be supported directly on lower glass panel 42.

Thus, the on and off operation of heating elements 46 and 48 can be independently controlled by a timing circuit which provides predetermined timing and power level sequences appropriate for the heating application. The timing can be started manually by the operator using a switch 58a-14 58e mounted to the housing of the oven. Alternatively oven device 10 can be started automatically by a switch coupled to wire rack 76 which is actuated when the food carrying device is placed into the oven onto rack 76. The latter switch can be activated, initiating the heating cycle, by the weight of the food carrying device on rack 76. Further, the latter switch could be a micro-switch activated by a paddle or other device as the paddle is struck by the food carrying device when that device is inserted into the oven.

In one embodiment, heating elements 46 and 48 are individually controlled by a series of timers operable to delay the start and independently cycle the heating elements to give the precise amount of heat required to be applied to the upper and lower surfaces of the food product without burning or scorching the food product. In one embodiment, the oven device could be configured to automatically eject the food products from the appliance at the end of the heating process.

Referring to FIGS. 7–9, a reflective wall panel 80 for the oven device is shown according to a further embodiment of the invention for improving the balance and distribution of browning and cooking of food items 36 placed within heating cavity 34 by dispersing and dissipating the radiant heat energy emitted from heating units 32 and 38. Reflective wall panel 80 may be integrated into oven device 10 in particular to replace the need for blowers 66. Accordingly, wall panel 80 is used to disperse heating properties such that fans 66 are not needed to provide even heating of items placed into heating cavity 34. In an exemplary embodiment, wall panel 80 may replace rear wall 18 of FIG. 1. A vertically-oriented frame member 82 is formed having a generally rectangular profile with an upper mounting surface 84, a lower mounting surface 86, a first side mounting surface 88 and a second side mounting surface 90. The frame member 82 includes a generally planer border portion 92 surrounding a generally rectangular opening 94 that may have rounded corners.

A reflective panel insert 96 is formed having a corrugated surface 98 shown schematically in FIG. 7, and defined by a series of alternating peaks 100 and valleys 102 for providing a radiant heat reflective surface for more uniformly dispersing and dissipating radiant heat energy emitted by heating units 32 and 38 for improving the balance and distribution of browning and cooking of the food items 36 placed within heating cavity 34. Peaks 100 and valleys 102 are shown preferably having a linear and horizontal orientation, but may also be configured having a linear and vertical orientation (not shown). In alternative embodiments, the reflective pattern of peaks 100 and valleys 102 may be circular or any other suitable pattern for enhancing the radiant heat energy dispersal and dissipation necessary to meet the heating needs of particular food items according to the particular geometrical proportions of cavity 22 and the configuration of heating elements 46 and 48.

Reflective panel insert 96 may be removably attached to an inner side of frame portion 92 by, for example, welding or fasteners (e.g., screws, rivets, etc.). The separability of frame portion 92 from reflective panel insert 96 facilitates the interchange of panel inserts having varying reflective patterns within a single frame member for customizing the radiant heat dissipation and dispersion properties of the ovens to suit the variety of applications necessary for the food service industry. Alternatively, panel insert 96 and frame portion 92 may be made from an integrally formed member.

A bracket member 104 is securely attached horizontally along a lower portion of frame member 82 and reflective panel insert 96 to complete the reflective wall panel 80. The elevation of bracket member 104 is located to interface with, and support, lower glass panel 42. Bracket member 104 may be provided with apertures 108 aligned with apertures 110 on frame member 82 for securing bracket member 104 to frame member 82 with fasteners. Alternatively, bracket member 104 may be secured to frame member 82 in any other suitable manner such as welding or riveting. Bracket member 104 may also be attached horizontally to an upper portion of frame member 82 to support upper glass panel 44. For embodiments of oven device 10 having vertically planer heating units (not shown), bracket member 104 may be oriented vertically on frame member 82 to support corresponding vertically planar glass panels (not shown).

Frame member 82, reflective panel 96 and bracket member 104 are preferably manufactured from food grade stainless steel sheet stock (e.g., type 304) having a thickness of approximately 0.036 inches and a 2B surface finish according to any well known stamping and bending process. However, frame member 82, reflective panel 96 and bracket member 104 may be formed of other suitable materials (e.g., aluminum, aluminized steel, chrome-plated carbon steel, etc.) and having any suitable thickness and surface finish for providing suitable radiant heat reflecting properties and for interfacing with adjacent components of oven device 10.

Reflective wall panel 80 may be adapted to fit along the interior of oven device 10 in a generally parallel orientation to one or more of the base 12, the left side wall 14, the right side wall 16, the rear wall 18 and the top 20, whereby the face of reflective panel insert 96 is exposed through opening 94 toward cavity 22 of oven device 10 for obtaining the desired radiant heat energy distribution performance. A plurality of fastener apertures 106 may be provided along upper mounting surface 84, lower mounting surface 86, first side mounting surface 88 and second side mounting surface 90 for attaching wall panel bracket 82 to the base 12, the left and right side walls 14 and 16, rear wall 18 and top 20.

In alternative embodiments, a reflective panel member may be unitarily or integrally formed with a frame member for mounting within the desired locations of the oven and the relative angle and spacing of the corrugation peaks and valleys on the reflective panels may be adjusted or modified to any appropriate pattern for obtaining the desired radiant heat distribution performance for uniformly cooking, heating or browning a variety of food items.

Thus, oven device 10 is capable of rapidly melting or browning the top surface of food items or complete meals, while also heating the serving plates or other food support assembly in addition to heating the food product itself. Testing of a prototype showed that oven device 10 reduced the heating time for melting or browning by a factor of three compared to the time needed by a conveyor oven. The reduced heating time is due to the rapid heating of heating elements 46 and 48, combined with the microprocessor-based control sequences which allow both the heating times and power levels to be programmed for different types of food items. The high level of control allows the rapid-heating and high power-output heating elements to rapidly heat the food items without scorching or burning the food items. The Halient heating elements used by oven device 10 reach operating temperatures within a few seconds (e.g., about 1–3 seconds from room temperature), and testing of a prototype showed that the air within the heating cavity reached a temperature of about 450° F. at a 25% power level within 1–2 seconds of the power being applied.

Oven device 10 also provides significant advantages with respect to the Salamander broiler. For example, while the Salamander broiler must be left on continually, oven device 10 can be turned on and off as needed, thereby decreasing both energy usage and the amount of heat vented into the kitchen. The decreased heat vented into the kitchen allows the exhaust hood or other ventilation method needed for the Salamander broiler to be dispensed with, and results in savings in air conditioning and ventilation costs. Another advantage of oven device 10 is that the edge of the serving plate or other food support assembly (i.e., the rim) need not be directly exposed to the radiant energy generated by the heating elements. This allows the operator to pick up the plate or dish by its rim without the need for insulated gloves or other means, which would not be possible with a conveyor oven.

While the embodiments shown in the FIGs. and described above are presently preferred, it should be understood that these embodiments are offered by way of example only. The invention is not intended to be limited to any particular embodiment, but is intended to extend to various modifications that nevertheless fall within the scope of the appended claims. For example, different configurations of the oven can be used, such as closed-end or pass-through ovens. The types, sizes, numbers and geometrical arrangements of the heating elements can be modified depending on the application of the oven device. The type of control unit can be changed, and different types and numbers of programmable or non-programmable timers can be used. Other modifications will be evident to those of skill in the art.

What is claimed is:

1. An oven device for final finishing of a food item, comprising:
    an oven housing defining a heating cavity therein, the heating cavity configured to receive at least one food item to be heated by the oven device;
    the oven housing including at least one reflective panel for distributing radiant heat within the heating cavity; and
    an upper heating unit disposed within the oven housing above the heating cavity, wherein the upper heating unit includes an upper heating element;
    the upper heating unit configured to generate radiant heat which is directed onto the at least one food item when the at least one food item is received in the heating cavity, wherein the upper heating element includes a rapidly-heating, high-intensity resistive ribbon heating element capable of being cycled on for final finishing of the at least one food item when the at least one food item is received in the heating cavity, and capable of being cycled off when such final finishing is not being performed, the resistive ribbon heating element configured to provide radiant energy directly to the food item.

2. The oven device of claim 1 wherein the reflective panel comprises a metallic panel having a corrugated surface pattern.

3. The oven device of claim 2 wherein the corrugated surface pattern has a longitudinal profile oriented parallel to a planar orientation of the resistive heating element.

4. The oven device of claim 3 wherein the corrugated surface pattern is linear and horizontal.

5. The oven device of claim 3 wherein the corrugated surface pattern is linear and vertical.

6. The oven device of claim 1 wherein the reflective panel is parallel to a back wall of the oven housing.

7. The oven device of claim 1 wherein the at least one reflective panel is generally parallel to one or more of a back wall, a side wall, a top or a base of the oven housing.

8. The oven device of claim 1 wherein the reflective panel has an interchangeable reflective insert.

9. The oven device of claim 1 wherein the reflective panel is unitarily formed.

10. The oven device of claim 1 wherein the reflective panel is made from stainless steel.

11. An oven device for final finishing of a food item, comprising:
   an oven housing defining a heating cavity therein, the heating cavity configured to receive at least one food item to be heated by the oven device;
   the oven housing including at least one reflective panel for distributing radiant heat within the heating cavity;
   an upper heating unit disposed within the oven housing above the heating cavity, wherein the upper heating unit includes an upper heating element;
   a lower heating unit disposed within the oven housing below the heating cavity, wherein the lower heating unit includes a lower heating element;
   the upper and lower heating units configured to generate radiant heat which is directed onto the at least one food item when the at least one food item is received in the heating cavity, the upper and lower heating elements each including a rapidly-heating, high-intensity resistive ribbon heating element capable of being cycled on for final finishing of the at least one food item when the at least one food item is received, and capable of being cycled off when such final finishing is not being performed, the resistive ribbon heating element configured to provide radiant energy directly to the food item.

12. The oven device of claim 11 wherein the reflective panel comprises a metallic panel having a corrugated surface pattern.

13. The oven device of claim 12 wherein the corrugated surface pattern has a longitudinal profile oriented parallel to a planar orientation of the resistive heating element.

14. The oven device of claim 13 wherein the corrugated surface pattern is linear and horizontal.

15. The oven device of claim 13 wherein the corrugated surface pattern is linear and vertical.

16. The oven device of claim 11 wherein the reflective panel is parallel to a back wall of the oven housing.

17. The oven device of claim 11 wherein the at least one reflective panel is parallel to one or more of a back wall, a side wall, a top or a base of the oven housing.

18. The oven device of claim 11 wherein the reflective panel has an interchangeable reflective insert.

19. The oven device of claim 11 wherein the reflective panel is made from stainless steel.

20. An oven device for final finishing of a food item, comprising:
   oven housing means for defining a heating cavity for receiving at least one food item;
   resistive ribbon heating means within the oven housing means for generating high-intensity radiant heat and for directing the heat directly onto a top surface of the at least one food item when the at least one food item is within the heating cavity;
   means for distributing the radiant heat within the heating cavity; and
   means for cycling the radiant heat on for final finishing of the at least one food item when the at least one food item is received within the heating cavity and for cycling the heat off when such final finishing is not being performed.

* * * * *